US008745738B2

(12) United States Patent
Xie et al.

(10) Patent No.: US 8,745,738 B2
(45) Date of Patent: Jun. 3, 2014

(54) VOUCHING FOR USER ACCOUNT USING SOCIAL NETWORKING RELATIONSHIP

(75) Inventors: Yinglian Xie, Cupertino, CA (US); Fang Yu, Sunnyvale, CA (US); Qifa Ke, Cupertino, CA (US); Martin Abadi, Palo Alto, CA (US); Eliot C. Gillum, Mountain View, CA (US); Krishna Vitaldevara, Fremont, CA (US); Jason D. Walter, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 14 days.

(21) Appl. No.: 13/350,806

(22) Filed: Jan. 15, 2012

(65) Prior Publication Data

US 2013/0185791 A1    Jul. 18, 2013

(51) Int. Cl.
| | | |
|---|---|---|
| *G06F 12/14* | (2006.01) | |
| *G06F 15/16* | (2006.01) | |
| *G06F 13/00* | (2006.01) | |
| *H04L 29/06* | (2006.01) | |
| *G06F 11/00* | (2006.01) | |

(52) U.S. Cl.
USPC ............ 726/22; 726/2; 726/3; 726/4; 726/17; 726/19; 726/21; 726/23; 726/24; 726/25; 726/26; 726/27; 726/28; 726/29

(58) Field of Classification Search
USPC .................................. 726/2–4, 17–19, 21–29
See application file for complete search history.

(56) References Cited

U.S. PATENT DOCUMENTS

| | | | |
|---|---|---|---|
| 7,484,012 | B2 | 1/2009 | Hinton et al. |
| 2006/0026593 | A1* | 2/2006 | Canning et al. ............... 718/100 |
| 2006/0248573 | A1 | 11/2006 | Pannu et al. |
| 2007/0208613 | A1* | 9/2007 | Backer ........................... 705/10 |
| 2008/0235353 | A1* | 9/2008 | Cheever et al. ............... 709/219 |
| 2010/0010826 | A1 | 1/2010 | Rosenthal et al. |
| 2010/0095374 | A1 | 4/2010 | Gillum et al. |
| 2012/0159647 | A1* | 6/2012 | Sanin et al. ...................... 726/28 |
| 2012/0290427 | A1* | 11/2012 | Reed et al. ................... 705/26.2 |
| 2013/0061288 | A1* | 3/2013 | Paim .................................. 726/4 |
| 2013/0073686 | A1* | 3/2013 | Sandholm ..................... 709/219 |

OTHER PUBLICATIONS

Hameed, et al., "LENS: Leveraging Social Networking and Trust to Prevent Spam Transmission", Retrieved at <<http://www.deutsche-telekom-laboratories.de/~panhui/publications/LENS11|CNP.pdf>>, Oct. 2011, pp. 6.

(Continued)

*Primary Examiner* — Joseph P. Hirl
*Assistant Examiner* — Kalish Bell
(74) *Attorney, Agent, or Firm* — Micah Goldsmith; Glen Johnson; Micky Minhas

(57) ABSTRACT

Trusted user accounts of an application provider are determined. Graphs, such as trees, are created with each node corresponding to a trusted account. Each of the nodes is associated with a vouching quota, or the nodes may share a vouching quota. Untrusted user accounts are determined. For each of these untrusted accounts, a trusted user account that has a social networking relationship is determined. If the node corresponding to the trusted user account has enough vouching quota to vouch for the untrusted user account, then the quota is debited, a node is added for the untrusted user account to the graph, and the untrusted user account is vouched for. If not, available vouching quota may be borrowed from other nodes in the graph.

20 Claims, 6 Drawing Sheets

(56) References Cited

OTHER PUBLICATIONS

Danezis, et al., "SybilInfer: Detecting Sybil Nodes using Social Networks", Retrieved at <<http://www.isoc.org/isoc/conferences/ndss/09/pdf/06.pdf>>, 2009, pp. 15.

Paula, Anchises M.G.De, "Security Aspects and Future Trends of Social Networks", Retrieved at <<http://www.ijofcs.org/V05N1-PP07-SECURITY-SOCIAL-NETS.pdf>>, Proceedings of the International Journal of Forensic Computer Science, 2010, pp. 60-79.

Srivianos, et al., "FaceTrust: Assessing the Credibility of Online Personas via Social Networks", Retrieved at <<http://www.cs.duke.edu/~msirivia/publications/facetrust.pdf>>, 2009, pp. 6.

Rashid, Fahmida, Y. "Cyber-Criminals Shift to Compromised Web Mail Accounts for Spam Delivery", Retrieved at <<. http://www.eweek.com/c/a/Messaging-and-Collaboration/CyberCriminals-Shift-to-Compromised-Web-Mail-Accounts-for-Spam-Delivery-808933/>>, Jul. 13, 2011, pp. 3.

"Google+", Retrived at <<https://plus.google.com>>, Retrieved date: Oct. 28, 2011, p. 1.

"Inside India's CAPTCHA-Solving Economy", Retrived at <<http://www.zdnet.com/blog/security/inside-indias-captcha-solving-economy/1835 >>, Aug. 29, 2008, pp. 5.

Turiel, Avi, "New spammer tactics compromised accounts now favored", Retrieved at <<http://blog.commtouch.com/cafe/data-and-research/new-spammer-tactics.>>, Jul. 12, 2011, pp. 4.

"Object CAPTCHA", Retrieved at <<.http://server251.theory.cs.cmu.edu/cgi-bin/esp-pix/esp-pix>>, Retrieved Date: Oct. 28, 2011, p. 1.

"ReCAPTCHA", Retrieved at <<http://www.google.com/recaptcha/learnmore>>, Retrieved Date: Oct. 28, 2011, pp. 2.

"Rise in Hacked Gmail, Hotmail and Yahoo Email", Retrieved at <<http: //www.boxaid.com/word/viruses and-malware/rise-in-hacked-gmail-hotmail-and-yahoo-email>>, Nov. 1, 2010, pp. 5.

Schneier, Bruce, "Spammers Using Porn to Break Captchas", Retrieved at <<http://www.schneier.com/blog/archives/2007/11/spammers_using.html>>, Nov. 1, 2007, pp. 6.

Ahn, et al., "Analysis of Topological Characteristics of Huge Online Social Networking Services", Retrieved at <<http://www2007.org/papers/paper676.pdf>>, May 8-12, 2007, pp. 835-844.

Chirita, et al., "MailRank: Global Attack-Resistant Whitelists for Spam Detection", Retrieved at <<http://citeseerx.ist. psu.edu/viewdoc/download?doi=10.1.1.59.1556&rep=rep1&type=pdf>>, 2005, pp. 8.

Bonato, et al., "A Geometric Model for On-line Social Networks", Retrieved at <<http://kmi.tugraz.at/workshop/MSM10/papers/msm10_bonato_poster.pdf>>, Jun. 13, 2010, pp. 2.

Bursztein, et al., "How Good are Humans at Solving CAPTCHAs? A Large Scale Evaluation", Retrieved at <<http://www.stanford.edu/~jurafsky/burszstein_2010_captcha.pdf>>, 2010, pp. 15.

Donceur, John, R., "The Sybil attack", Retrieved at <<http://secs.ceas.uc.edu/~oscar/p2parea/security/secu1.pdf>>, 2002, pp. 1-6.

Grier, et al., "Spam: The Underground on 140 Characters or Less", Retrieved at <<http://www.icir.org/vern/papers/ccs2010-twitter-spam.pdf>>, Oct. 4-8, 2010, pp. 11.

Hao, et al., "Detecting Spammers with SNARE: Spatio-temporal Network-level Automatic Reputation Engine", Retrieved at <<http://www.usenix.org/events/sec09/tech/full_papers/sec09_network.pdf>>, 2009, pp. 50.

Kleinberg, Jon, "The Small-World Phenomenon: An Algorithmic Perspective", Retrieved at <<http://citeseerx.ist.psu.edu/viewdoc/download?doi=10.1.1.65.5571&rep=rep1&type=pdf>>, 2000, pp. 163-170.

Mislove, et al., "Measurement and Analysis of Online Social Networks", Retrieved at <<http://cs.northwestern.edu/~akuzma/classes/CS495-s09/doc/p1.pdf>>, Oct. 24-26, 2007, pp. 14.

Motoyama, et al., "Re: CAPTCHAs Understanding CAPTCHA-Solving Services in an Economic Context", Retrieved at <<http://www.usenix.net/events/sec10/tech/full_papers/Motoyama.pdf>>, 2010, pp. 18.

Boykin, et al., "Leveraging Social Networks to Fight Spam", Retrieved at <<http://citeseerx.ist.psu.edu/viewdoc/download?doi=10.1.1.88.8532&rep=rep1&type=pdf>>, Apr. 2005, pp. 61-68.

Post, et al., "Bazaar: Strengthening User Reputations in Online Marketplaces", Retrieved at <<http://www.usenix.org/event/nsdi11/tech/full_papers/Post.pdf>>, 2011, pp. 14.

Tran, et al., "Sybil-Resilient Online Content Voting", Retrieved at <<http://citeseerx.ist.psu.edu/viewdoc/download?doi=10.1.1.148.5799&rep=rep1&type=pdf>>, Proceedings of 6th USENIX Symposium on Networked Systems Design and Implementation, 2009, pp. 15-28.

Wilson, et al., "User Interactions in Social Networks and their Implications", Retrieved at <<http://www-users.cselabs.umn.edu/classes/Spring-2010/csci8211/Readings/OSN-User%20Interactions%20in%20Social%20Networks%20and%20their%20Implications-interaction-eurosys09.pdf>>, Apr. 1-3, 2009, pp. 14.

Xie, et al., "Spamming Botnets: Signatures and Characteristics", Retrieved at <<http://fuxi.cs.txstate.edu/~nasdg/papers/2008sigcomm/Spamming/%20Botnets%20Signatures%20and%20Characteristics%202008.pdf>>, Aug. 17-22, 2008, pp. 171-182.

Yu, et al., "SybilLimit: A Near-Optimal Social Network Defense against Sybil Attacks", Retrieved at <<http://ieeexplore.ieee.org/stamp/stamp.jsp?tp=&arnumber=5313843>>, Proceedings of IEEE/ACM Transactions on Networking, vol. 18, No. 3, Jun. 2010, pp. 885-898.

Yu, et al., "SybilGuard: Defending Against Sybil Attacks via Social Networks", Retrieved at <<http://www.comp.nus.edu.sg/~yuhf/sybilguard-sigcomm06.pdf>>, In Proceedings of the ACM SIGCOMM Conference on Computer Communications, Sep. 11-15, 2006, pp. 12.

Yu, et al., "DryadLINQ: A System for General-Purpose Distributed Data-Parallel Computing Using a High-Level Language", Retrieved at <<http://research.microsoft.com/pubs/70861/DryadLINQ-osdi.pdf>>, Proceedings of 8th USENIX Symposium on Operating Systems Design and Implementation, 2008, pp. 1-14.

Zhao, et al., "BotGraph: Large Scale Spamming Botnet Detection", Retrieved at <<http://research.microsoft.com/pubs/79413/botgraph.pdf>>, 2009, pp. 14.

"Using Social Graphs to Combat Malicious Attacks", U.S. Appl. No. 13/070,497, filed Mar. 24, 2011, pp. 27.

\* cited by examiner

VOUCHING FOR USER ACCOUNT USING SOCIAL NETWORKING RELATIONSHIP

BACKGROUND

The success of the Internet can be largely attributed to the proliferation of online services. Online services play an indispensable role in people's daily lives, providing open and free access to activities such as email, search, social networking, and blogging. The popularity of the services and the open access model have, in turn, attracted attackers to leverage these free resources as a major attack venues. Within the last few years, millions of malicious accounts and their nefarious activities—including spam, phishing, social scam, and malware propagation—have become a pervasive problem throughout the Internet.

CAPTCHAs are widely deployed to prevent attackers from abusing services at a large scale. A CAPTCHA test typically has a user type letters or digits from a distorted image, which is easier to read for humans than for automated programs. CAPTCHAs are usually given to a user at service sign-up time and also frequently afterwards until the user establishes reputation. Although they are often effective to distinguish human users from bots, attackers have various mechanisms to bypass CAPTCHAs, such as by hiring cheap human labor.

It is commonly recognized that the social network structure may contribute to the defense against attacker created accounts, since a legitimate user would rarely establish connections with attackers. However, attackers are increasingly compromising legitimate user accounts, and using those accounts to connect to other malicious accounts. These malicious users invalidate the assumption that a legitimate user would rarely establish connections with other malicious users, and make preventing malicious attacks by leveraging social network relationships difficult.

SUMMARY

Trusted user accounts of an application provider are determined. Graphs, such as trees, are created with each node corresponding to a trusted account. Each of the nodes is associated with a vouching quota, or the nodes may share a vouching quota. Untrusted user accounts are determined. For each of these untrusted accounts, a trusted user account that has a social networking relationship is determined. If the node corresponding to the trusted user account has enough vouching quota to vouch for the untrusted user account, then the quota is debited, a node is added for the untrusted user account to the graph, and the untrusted user account is vouched for. If not, available vouching quota may be borrowed from other nodes in the graph. If no quota could be borrowed, the request is not honored and the requested user is not added to the trusted user graph for the time being. User accounts associated with newly added nodes may be precluded from vouching for nodes for a predetermined amount of time.

In some implementations, a set of trusted user accounts is received at a computing device. A trusted user account in the set of trusted user accounts with which an untrusted user account has a social networking relationship is determined by the computing device. Whether a vouching quota associated with the determined trusted user account is greater than a vouching cost is determined by the computing device. If it is determined that the vouching quota is greater than the vouching cost, an indicator vouching for the untrusted user account is generated by the computing device.

In some implementations, a request to determine if a trusted user account can vouch for an untrusted user account is received at a computing device. A graph with a node corresponding to the trusted user account from a plurality of graphs is determined at the computing device. Each graph has a plurality of nodes, and each node has an associated vouching quota. Whether the vouching quota associated with the node corresponding to the trusted user account is greater than a vouching cost is determined at the computing device, and if so, a message, or other indicator, indicating that the trusted user account can vouch for the untrusted user account is generated by the computing device.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of preferred embodiments, is better understood when read in conjunction with the appended drawings. For the purposes of illustration, there is shown in the drawings exemplary embodiments; however, these embodiments are not limited to the specific methods and instrumentalities disclosed. In the drawings.

DETAILED DESCRIPTION

Figure 1:
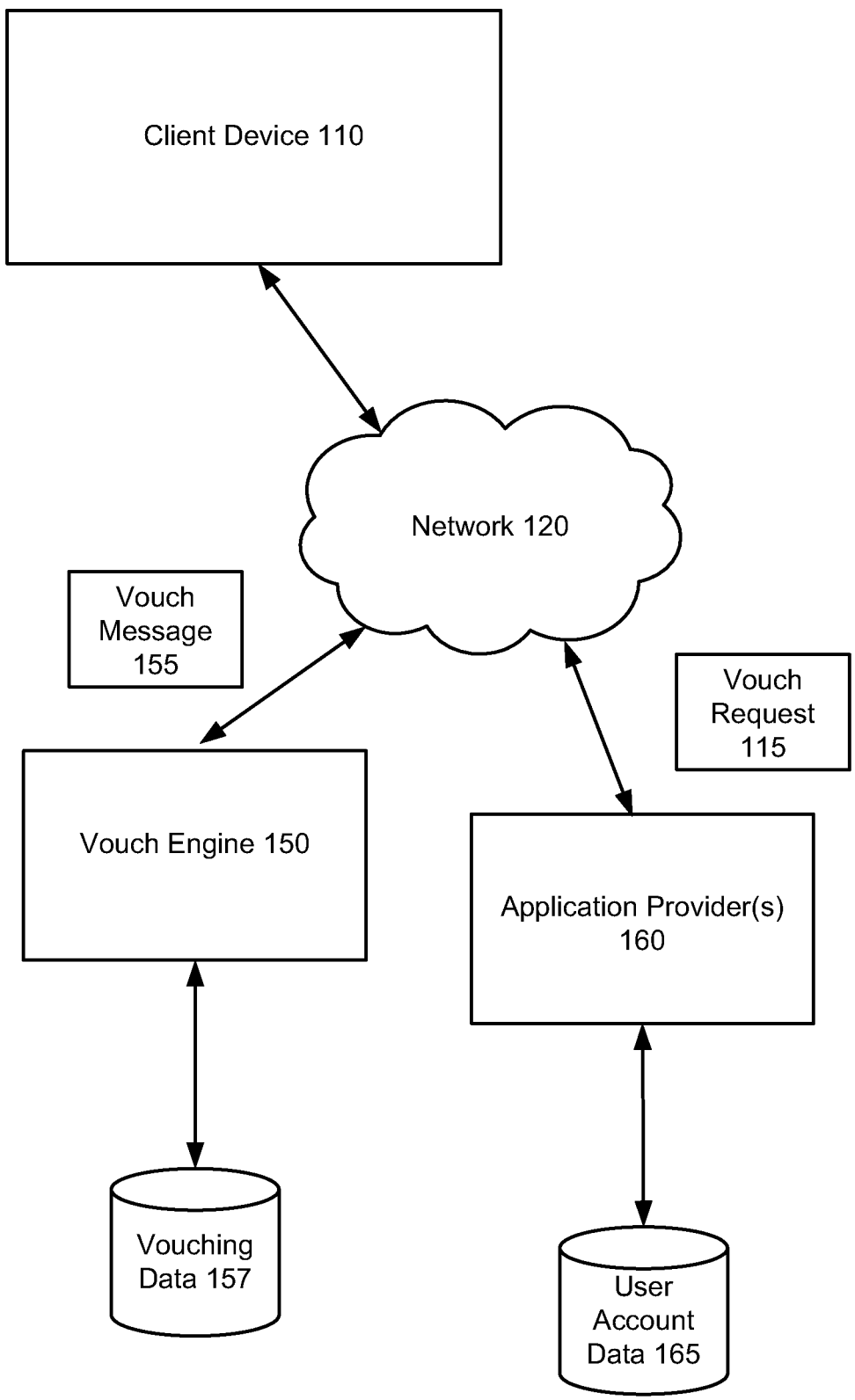
FIG. 1 is an illustration of an example environment for vouching for user accounts.

FIG. 1 is an illustration of an example environment 100 for vouching for user accounts. A client device 110 may communicate with one or more application providers 160 through a network 120. The client device 110 may be configured to communicate with the application providers 160 to use one or more applications services. The network 120 may be a variety of network types including the public switched telephone network (PSTN), a cellular telephone network, and a packet switched network (e.g., the Internet).

In some implementations, the client device 110 may include a desktop personal computer, workstation, laptop, PDA, smart phone, cell phone, or any WAP-enabled device or any other computing device capable of interfacing directly or indirectly with the network 120. The client device 110 may run an HTTP client, e.g., a browsing program, such as MICROSOFT INTERNET EXPLORER or other browser, or a WAP-enabled browser in the case of a cell phone, PDA or other wireless device, or the like. The client device 110 may be implemented using a general purpose computing device such as the computing device 600 illustrated in FIG. 6, for example.

In some implementations, the application provider 160 may provide application services to one or more users through the network 120. Example application services may include email services, photography related services, social networking services, and music or film related services. Other services may also be supported. A user may connect to the application provider 160 to create a user account using the client device 110, and may then use one or more of the application services provided by the application provider 160.

The application provider 160 may store information regarding the various user accounts that are associated with the application provider 160 as user account data 165. The user account data 165 may include identifiers of the various user accounts, as well as social networking data associated with the user accounts. As used herein, social networking data may be any data that is related to or indicative of interactions or relationships between the user accounts of the application provider 160. For example, the social networking data may include indicators of messages or emails sent between the user accounts, indicators of "friend" relationships or other voluntary associations between user accounts, and indicators or files or other data shared between user accounts.

As described above, malicious users may create user accounts with the application provider 160 for nefarious purposes. In order to prevent the creation of malicious user accounts or to otherwise limit the services that a user can use with a maliciously created user account, the environment 100 may include a vouch engine 150. The vouch engine 150 may provide information that is indicative of the trustworthiness, or non-trustworthiness, of a user account to the application provider 160, and the application provider 160 may then determine whether to allow or deny the user account access to services, or may determine whether to close the user account. Providing Information that is indicative that a user account is trustworthy is referred to herein as vouching for the user account. Vouching may be directional from a user A to a user B. Although shown as comprised within separate devices over the network 120, depending on the implementation, the application provider 160 and the vouch engine 150 may be comprised within a single computing device, or one or more other computing devices that may or may not communicate over the network 120. In addition, while only one vouch engine 150 is illustrated, in some implementations, there may be multiple vouch engines. For example, each of the vouch engines may vouch for a subset of the user accounts associated with the application provider 160.

The application provider 160 may request that the vouch engine 150 vouch for a user account by generating a vouch request 115 and sending the vouch request 115 to the vouching engine 150. The vouch request 115 may include an identifier of a user account that the application provider 160 is requesting the vouch engine 150 to vouch for. The vouch request 115 may be generated when the user account is created, after the user account has been active for a predetermined amount of time, or after the user account uses a service of the application provider 160 more than a predetermined number of times, depending on the implementation. For example, in the case of an application provider 160 that is an email provider, the vouch request 115 may be generated after the email account has been active for a week, or after the email account receives more than e.g., ten messages from another trusted account.

In addition, in some implementations, the vouch request 115 may include an identifier of a trusted user account and an untrusted user account. The request 115 may be a request to determine if the trusted user account can vouch for the untrusted user account. The trusted user account may be a user account that the untrusted user account has a social networking relationship with as determined by the application provider 160. A social networking relationship as used herein may be defined as a relationship that is established when the social networking data associated with the user accounts meets some threshold. For example, a trusted user account may have a social networking relationship with an untrusted user account after the trusted user and the untrusted user exchange a predetermined number of emails or instant messages via the application provider 160, or after the trusted and untrusted user exchange a predetermined number of photos, videos, or other media. What constitutes as a social networking relationship between the trusted and the untrusted user accounts may be determined by a user or administrator and may depend on the type of application provider 160.

The vouch engine 150 may generate and provide a vouch message 155 in response to the vouch request 115. Depending on the implementation, the vouch message 155 may indicate that the vouch engine 150 can vouch for the untrusted user account, or indicate that the vouch engine 150 cannot vouch for the untrusted user account, or indicate that the trusted user account can vouch for the untrusted user account, or indicate that the trusted user account cannot vouch for the untrusted user account.

The vouch message 155 may be generated based on vouching data 157 which are generated and maintained (e.g., in storage) by the vouch engine 150. In some implementations, the vouching data 157 may be generated by the vouch engine 150 in part based on user account data 165 associated with the application provider 160. In some implementations, the vouching data 157 may include identifiers of a set of trusted user accounts of the application provider 160. The set of trusted user accounts may be initially created from the user account data 165 based on the social networking data associated with the user accounts, but may be expanded to include other user accounts that the vouch engine 150 vouches for.

In implementations where the vouch engine 150 is integrated into the application provider 160, rather than generating a vouch message 155 that indicates that a trusted user account vouches for an untrusted user account, the vouch engine 150 may generate an indicator that the trusted user account vouches for the untrusted user account. For example, an indicator may be an entry in a record, and the vouch engine 150 may set the entry in a record associated with the untrusted user account to indicate that the trusted user account vouches for the untrusted user account.

In order to reduce the ability of malicious user accounts to vouch for other malicious accounts, rate limiting may be used to control the amount of user accounts that can be vouched for over some period of time. For example, a determination may be made as to what a "normal" growth rate in user accounts for the application provider 160 is, and the vouch engine 150 may then limit the number of user accounts that can be vouched for based on the determined growth rate.

One way to implement rate limiting is through the use of what is referred to herein as vouching quota. The vouching quota may limit the number of user accounts that the vouch engine 150 can vouch for over a given period of time. After the vouch engine 150 vouches for a user account, the vouching quota may be debited by a vouching amount or cost. The amount of vouching quota stored in the vouching data 157 may be set by a user or administrator and may be based on the determined normal or historical growth rate for user accounts in the application provider 160. A global vouching quota may be associated with all of the trusted user accounts. Alternatively, each trusted user account in the set of trusted user accounts may be associated with its own vouching quota. In some implementations, rather than store the vouching quota with the vouching data 157 at the vouch engine 150, each user account may be provided an amount of vouching quota that is "redeemed" by the user account when it vouches for another user account.

The vouching quota for a user account may be set when the user account has been created or after determining that the user account is a trusted user account. The amount of vouching quota associated with a user account may be fixed, or may be increased from time to time. For example, a user account may receive more vouching quota every month, year, etc. The amount that the vouching quota is increased may be based on a desired or normal growth rate of user accounts in the application provider 160.

In some implementations, additional quota may be assigned to a user account after the user takes one or more actions that are considered trustworthy. Trustworthy actions may include performing some number of actions, using an anti-virus application, posting a bond or other guarantee, etc. A user account that is sufficiently trusted may be given an infinite amount of vouching quota.

The vouch engine 150 may receive a vouch request 115 and may determine whether to vouch for a user account identified by the vouch request 115 based on the vouching quota. Where the vouch request 115 includes an identifier of a trusted user account and an identifier of an untrusted user account, the vouch engine 150 may determine whether the trusted user account can vouch for the untrusted user account. The identified trusted user account may be a user account that has a social networking relationship with the identified untrusted user account. The vouch engine 150 may make the decision by determining whether the trusted user account has vouching quota that is greater than the vouching cost.

If the identified trusted account has enough vouching quota, then the vouch engine 150 may generate a vouch message 155, or other indicator, that indicates that the trusted account vouches for the untrusted user account. The vouch engine 150 may further add the untrusted user account to the set of trusted user accounts, and debit the vouching quota associated with the trusted user account by the vouching cost.

Where the vouch request 115 includes only an identifier of an untrusted user account, the vouch engine 150 may determine a trusted user account in the set of trusted user accounts that has a social networking relationship with the untrusted user account. The vouch engine 150 may then determine if the trusted user account has vouching quota that is greater than the vouching cost. If the trusted user account has enough vouching quota, then the vouch engine 150 may generate a vouch message 155, or other indicator, that indicates that the determined trusted user account vouches for the untrusted user account. The vouch engine 150 may further add the untrusted user account to the set of trusted user accounts, and debit the vouching quota associated with the determined trusted user account by the vouching cost.

Figure 2:
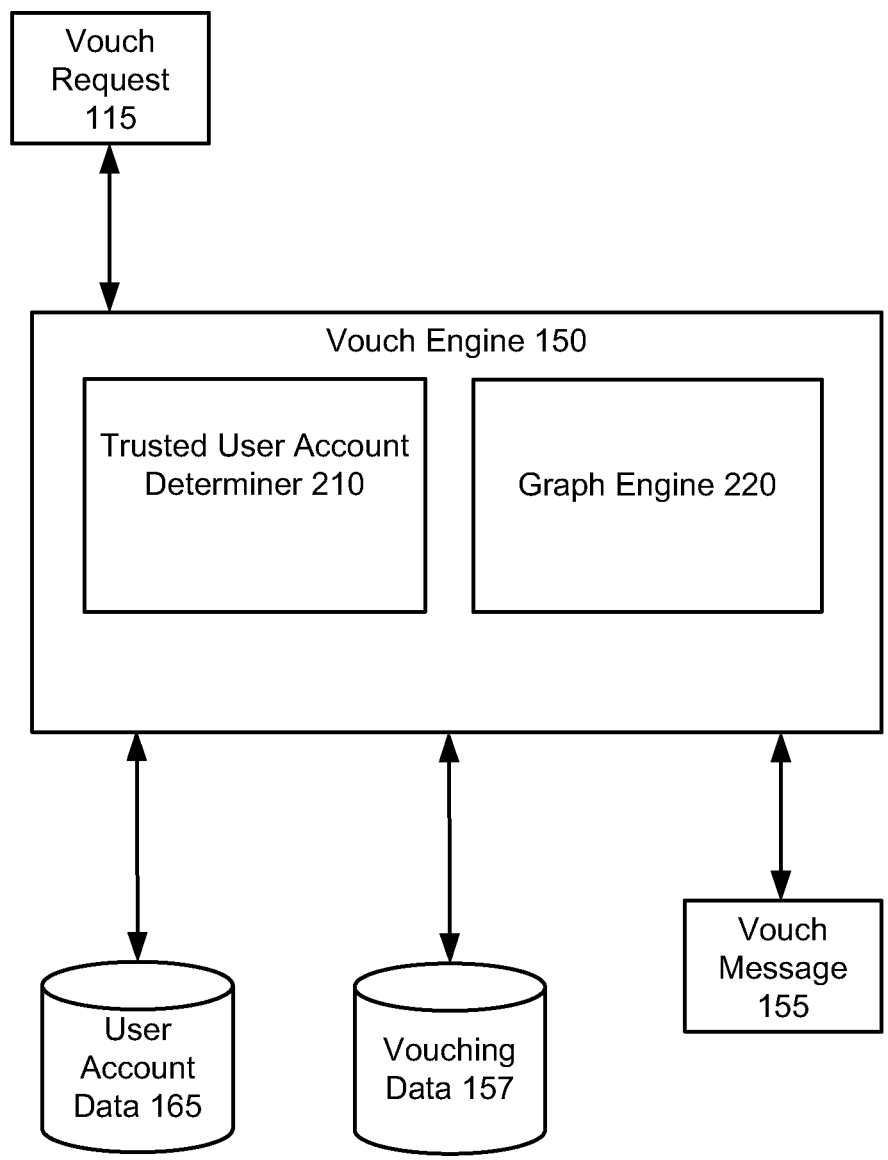
FIG. 2 is an illustration of an example vouch engine.

FIG. 2 is an illustration of an example vouch engine 150. As illustrated, the vouch engine 150 may include a trusted user account determiner 210 and a graph engine 220. More or fewer components may be supported by the vouch engine 150. The components of the vouch engine 150 may each be implemented using a general purpose computing device such as the computing device 600 described with respect to FIG. 6, for example. As will be described further below, the vouch engine 150 may operate in two phases: an initial phase and a growth phase. During the initial phase, the trusted user account determiner 210 may determine a set of likely trusted user accounts of the application provider 160. During the growth phase, the graph engine 220 may use the set of trusted user accounts to generate and maintain a vouching graph that may be used by the vouch engine 150 to vouch for user accounts.

During the initial phase, the trusted user account determiner 210 may receive the user account data 165 from the application provider 160, and may process the data to generate a social graph of the user accounts associated with the application provider 160. The trusted user account determiner 210 may generate the social graph based on the social networking relationships between the user accounts as indicated by the user account data 165. The social graph may be an undirected graph; however, other types of graphs or data structures may be used.

After generating the social graph, the trusted user account determiner 210 may determine a giant connected component (GCC) in the social graph. Social graphs may feature several clusters of user accounts that are connected to one another either directly or indirectly through some sequence of user accounts. Typically, the largest of these clusters (i.e., the GCC) includes most of the users of the application or social network. User accounts that are part of the GCC are likely to be associated with normal or non-malicious users, while user accounts that are outside of the GCC may either be user accounts that are not used, or may be associated with malicious or non-trustworthy (i.e., untrustworthy) users.

Accordingly, to take advantage of this property, during the initial stage, the trusted user account determiner 210 may determine an initial set of trusted user accounts from the GCC of the social graph. The initial set of trusted user accounts may be stored by the trusted user account determiner 210 in the vouching data 157. While the initial set of trusted user accounts are described as being determined based on social networking relationships, any other type of known trusted relationships between users or user accounts may be used to determine the initial set of trusted user accounts.

The graph engine 220 may receive the set of trusted user accounts determined by the trusted user account determiner 210, and may use the user accounts in the set of trusted user accounts to generate one or more vouching graphs. Each vouching graph may have a plurality of nodes, and each node may correspond to a trusted user account. An edge between a node A and a node B may indicate that the trusted user account associated with the node A has vouched for the trusted user account associated with the node B. The vouching graphs may be implemented using a variety of data structures including trees. In some implementations, the graph engine 220 may generate a tree for each of the user accounts in the set of trusted user accounts. Each tree may include a root node that corresponds to the trusted user account associated with the tree.

The graph engine 220 may further associate each node in the vouching graphs with a vouching quota. The vouching quota associated with a node may be used to determine if the user account associated with the node may vouch for another user account. The amount of vouching quota needed to vouch for a user account is the vouching cost. The amount of vouching quota given to each node, and the vouching cost, may be set by a user or administrator.

During the growth phase, the graph engine 220 may receive identifiers of a trusted user account and an untrusted user account from the vouch engine 150, and may determine if the trusted user account can vouch for the untrusted user account. Depending on the implementation, the identifiers of the trusted and the untrusted user accounts may have been both received in a vouch request 115 from the application provider 160, or only one identifier of an untrusted user account was received and the vouch engine 150 determined the identifier of the trusted user account based on the user account data 165. For example, the vouch engine 150 may determine a trusted user account from the set of trusted user accounts that the identified untrusted user account has a social networking relationship with.

In some implementations, the graph engine 220 may determine if the trusted user account can vouch for the untrusted user account by determining the vouching graph that includes a node corresponding to the trusted user account. If the vouching quota associated with the node is greater than the vouching cost, then the graph engine 220 may determine that the trusted user account may vouch for the untrusted user account. The vouch engine 150 may then generate a vouch message 155 that grants the vouch request 115, and may provide the vouch message 155 to the application provider 160. Alternatively or additionally, the vouch engine 150 may generate an indicator that indicates that the vouch request 115 is granted by setting an entry in a table or other data structure associated with the untrusted user account.

The graph engine 220 may also add the untrusted user account to the set of trusted user accounts by adding a node corresponding to the untrusted user account to the determined vouching graph, and may debit the vouching quota of the node corresponding to the trusted user account by the vouching cost. The node for the untrusted user account may be connected to the node corresponding to the trusted user account by an edge between the two nodes. In implementations where the vouching graphs are trees, the graph engine 220 may add a node corresponding to the untrusted user account to the tree as a child node of the node corresponding to the first node.

Figure 3:
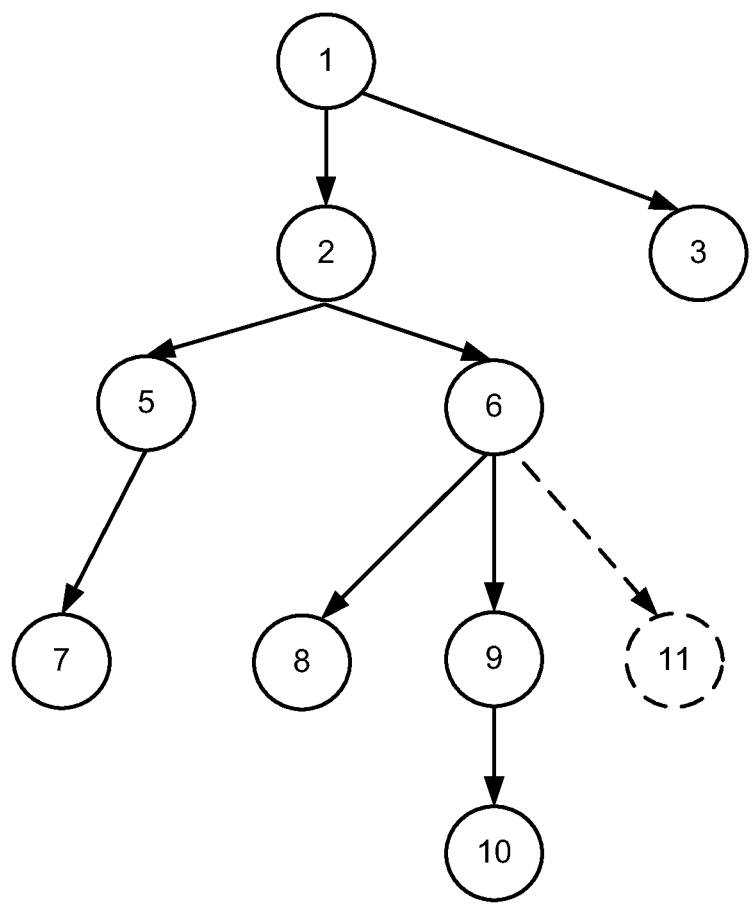
FIG. 3 is an illustration of an example vouching graph.

For example, FIG. 3 is an illustration of a vouching graph 300 that is represented by a tree. The graph 300 may initially include nodes 1-10 that are associated with trusted user accounts in the application provider 160. The graph engine 220 may have determined that the user account corresponding to the node 6 can vouch for an untrusted user account. Accordingly, a node 11 that corresponds to the vouched for untrusted user account is added to the tree as a child node of the node 6.

In some implementations, the graph engine 220 may maintain a lookup table that maps trusted user accounts to nodes of the vouching graphs. The lookup table may be used by the graph engine 220 to quickly identify the vouching graph and node that corresponds to each of the trusted user accounts. The lookup table may be maintained in memory by the graph engine 220.

When the graph engine 220 determines that a node associated with a trusted user account does not have enough vouching quota to vouch for an untrusted user account, the graph engine 220 may deny the vouch request, and the vouch engine 150 may generate a vouch message 155 or other indicator that denies the vouch request and may provide the vouch message 155 to the application provider 160. Alternatively, the graph engine 220 may set an indicator in a table or other data structure that indicates that the untrusted user account is not vouched for. In addition, in some implementations, rather than deny the vouch request, the graph engine 220 may "borrow" vouching quota from one or more other nodes in the vouching graph. If the sum of the borrowed vouching quota is greater than the vouching cost, the graph engine 220 may vouch for the untrusted user account, and may add a node corresponding to the untrusted user account to the vouching graph as a child node of the node corresponding to the trusted user account.

In some implementations, when borrowing vouching quota, the graph engine 220 may borrow equally from each node in the vouching graph and may debit the vouching quota of each node in the vouching graph by a portion of the vouching cost. In other implementations, the graph engine 220 may borrow vouching quota from nodes in the vouching graph along a path of nodes until sufficient vouching quota has been borrowed from the nodes in the path. The vouching quota of each node in the path may then be debited according to the amount of vouching quota that was borrowed. In an implementation, the path of nodes may be defined by first borrowing quota from descendent nodes, then parent nodes, and then sibling nodes. Other paths may be used.

For example, with respect to FIG. 3, the node 6 may not have enough vouching quota to vouch for the untrusted user account corresponding to the hypothetical node 11. The graph engine 220 may attempt to borrow quota from other nodes along a path starting with the descendants of the node 6 (i.e., the nodes 8, 9, and 10), followed by the parents of the node 6 (i.e., the nodes 2 and 1), and further followed by the siblings of the node 6 (i.e., the node 5).

In some implementations, the graph engine 220 may only borrow quota for a node from other nodes in what is referred to as a sub-graph of the vouching graph that includes a node. The sub-graph for a node may include the parent node of the node, and all descendants of the parent node. Thus, referring to FIG. 3, when determining if the node 6 can borrow vouching quota from its sub-graph to add the hypothetical node 11, the sub-graph of the node 6 may include the node 2, the node 5, the node 7, the node 8, the node 9, and the node 10. By limiting nodes to borrowing quota from their sub-graph, the ability of new malicious user accounts, and the ability of children of malicious user accounts, to vouch for other malicious user accounts is reduced.

In order to further control the ability of malicious user accounts to vouch for other malicious user accounts, the graph engine 220 may use one or more heuristics. One such heuristic is the vouching delay heuristic. In the vouching delay heuristic, after a node associated with a trusted user account is used to vouch for a node associated with an untrusted user account, the node associated with the trusted user account may be precluded from vouching for another node for some predetermined amount of time. Similarly, when a new node is added to a vouching graph, the new node may similarly be precluded from vouching for nodes for the predetermined amount of time.

Another heuristic is the old node heuristic. Nodes in a vouching graph that are older than some predetermined amount of time are known as old nodes and nodes that are younger than the predetermined time are known as young nodes. As may be appreciated, old nodes are more likely to be associated with non-malicious accounts than young nodes. Accordingly, when a node borrows vouching quota from one or more nodes in a path, the sum of the borrowed quota may be discounted based on the number of young nodes in the path versus old nodes. For example, the sum may be multiplied by a ratio of old nodes to total nodes in the path.

Another heuristic is the small graph heuristic. In the small graph heuristic, after the graph engine 220 adds a node to a vouching graph, the graph engine 220 may determine if the vouching graph has more than a threshold number of nodes. If so, the graph engine 220 may split the vouching graph into two vouching graphs. In some implementations, the graph engine 220 may split the graph by removing the sub-graph that includes the newly added node, and creating a new vouching graph for the sub-graph. After splitting the graph, the graph engine 220 may update the lookup table to reflect the new vouching graphs. By keeping the size of the vouching graphs small, the amount of vouching quota that a node can borrow in a vouching graph is controlled.

Figure 4:
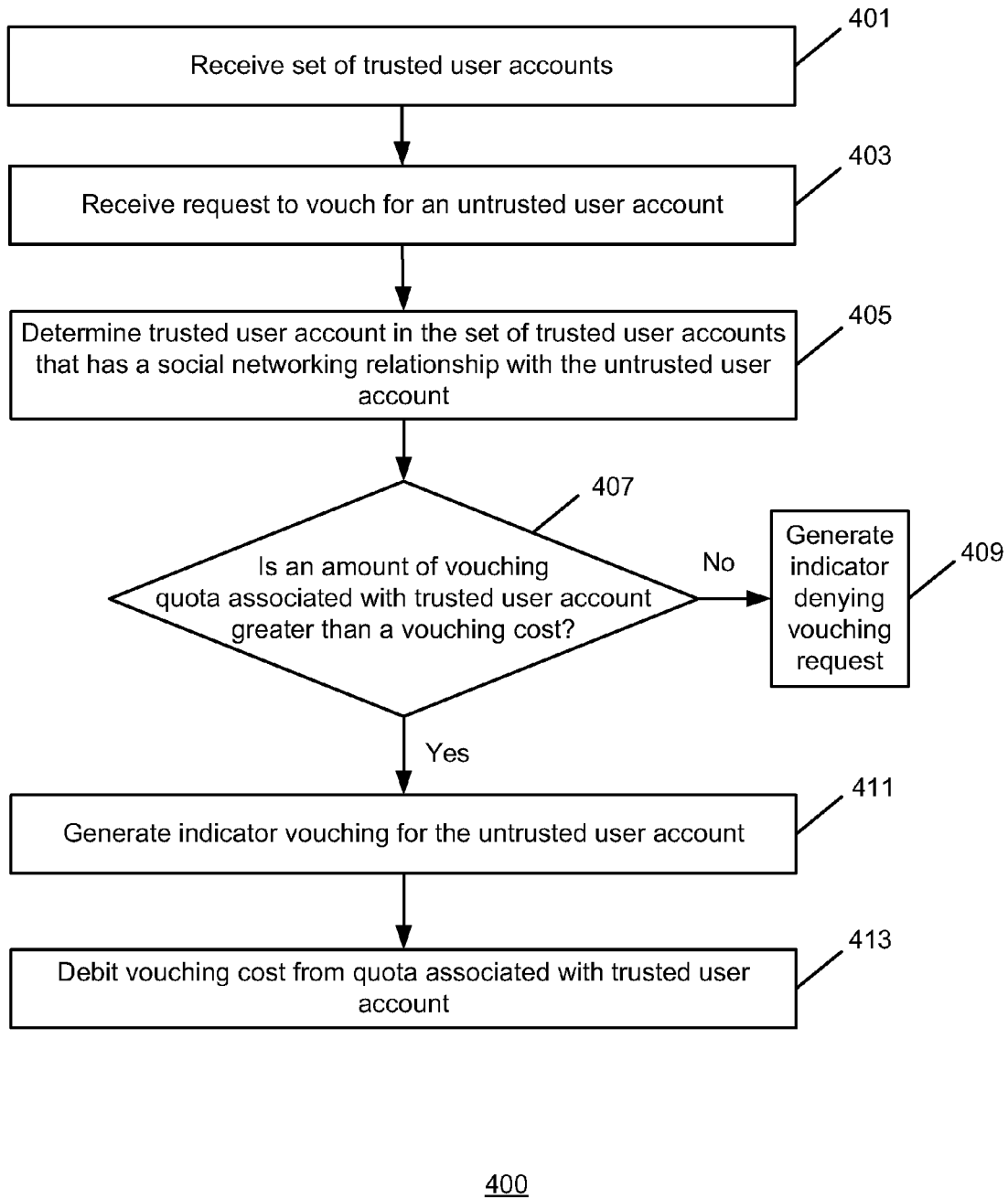
FIG. 4 illustrates an operational flow diagram of an exemplary method for vouching for user accounts.

FIG. 4 illustrates an operational flow diagram of an exemplary method 400 for vouching for user accounts. The method 400 may be implemented by the vouch engine 150, for example.

A set of trusted user accounts is received at 401. The set of trusted user accounts may be received from the vouching data 157 by the vouch engine 150. The set of trusted user accounts may be user accounts of an application provider 160. In some implementations, the set of trusted user accounts may be in the form of one or more vouching graphs. The vouching graphs may be trees.

A request to vouch for an untrusted user account is received at 403. The request to vouch for a user account may be received by the vouch engine 150 from the application provider 160. The untrusted user account may be a new account in the application provider 160, or may be an existing untrusted user account that may have been active for a threshold amount of time or that may have taken a threshold number of actions. For example, where the application provider 160 is an email provider, the application provider 160 may generate a vouch request 115 requesting that the vouch engine 150 vouch for an untrusted user account after the account has been open for a week, or after the account sends more than ten emails. In some implementations, rather than receive a request to vouch for a user account from the application provider 160, the vouch engine 150 may proactively begin a process of determining whether the actions of a trusted user account amount to vouching for a previously untrusted user account.

A trusted user account in the set of trusted user accounts that has a social networking relationship with the untrusted user account is determined at 405. The trusted user account may be determined by the vouching engine 150 from the user account data 165. In some implementations, a user account may have a social networking relationship with another user account after one or both of the users associated with the user accounts take some number of actions that indicate the users know each other. For example, where the application provider 160 is an email provider, the untrusted user account may be determined to have a social networking relationship with any user trusted account with which the untrusted user account had an email exchange of more than two emails.

A determination is made as to whether the vouching quota associated with the trusted user account is greater than a vouching cost at 407. The determination may be made by the vouch engine 150. If the vouching quota is greater than the vouching cost, then the method 400 may continue at 411. Otherwise, the method 400 may continue at 409. In some implementations, the determination may be made by the vouch engine 150 by determining a vouching tree from the vouching data 157 that includes a node corresponding to the determined trusted user account. The vouching engine 150 may then determine if the vouching quota associated with the node is greater than the vouching cost.

An indication that the vouching request is denied is generated at 409. The indication may be the vouch message 155 and the vouch message 155 may be further provided by the vouch engine 150 to the application provider 160.

An indication vouching for the untrusted user account is generated at 411. The vouching quota associated with the determined trusted user account may have been determined to be greater than the vouching cost, and the determined trusted user account may be used to vouch for the untrusted user account. Accordingly, the vouch engine 150 may generate an indication, such as a vouch message 155, and may provide the indication to the application provider 160 that vouches for the untrusted user account.

The vouching cost is debited from the vouching quota associated with the trusted user account at 413. The vouching quota may be debited by the vouch engine 150. In addition, the untrusted user account that was vouched for may be added to the set of trusted user accounts. In some implementations, the untrusted user account may be added by adding a child node corresponding to the untrusted user account to the node corresponding to the determined trusted user account in the vouching data 157. Some amount of vouching quota may also be associated with the node corresponding to the added node.

Figure 5:
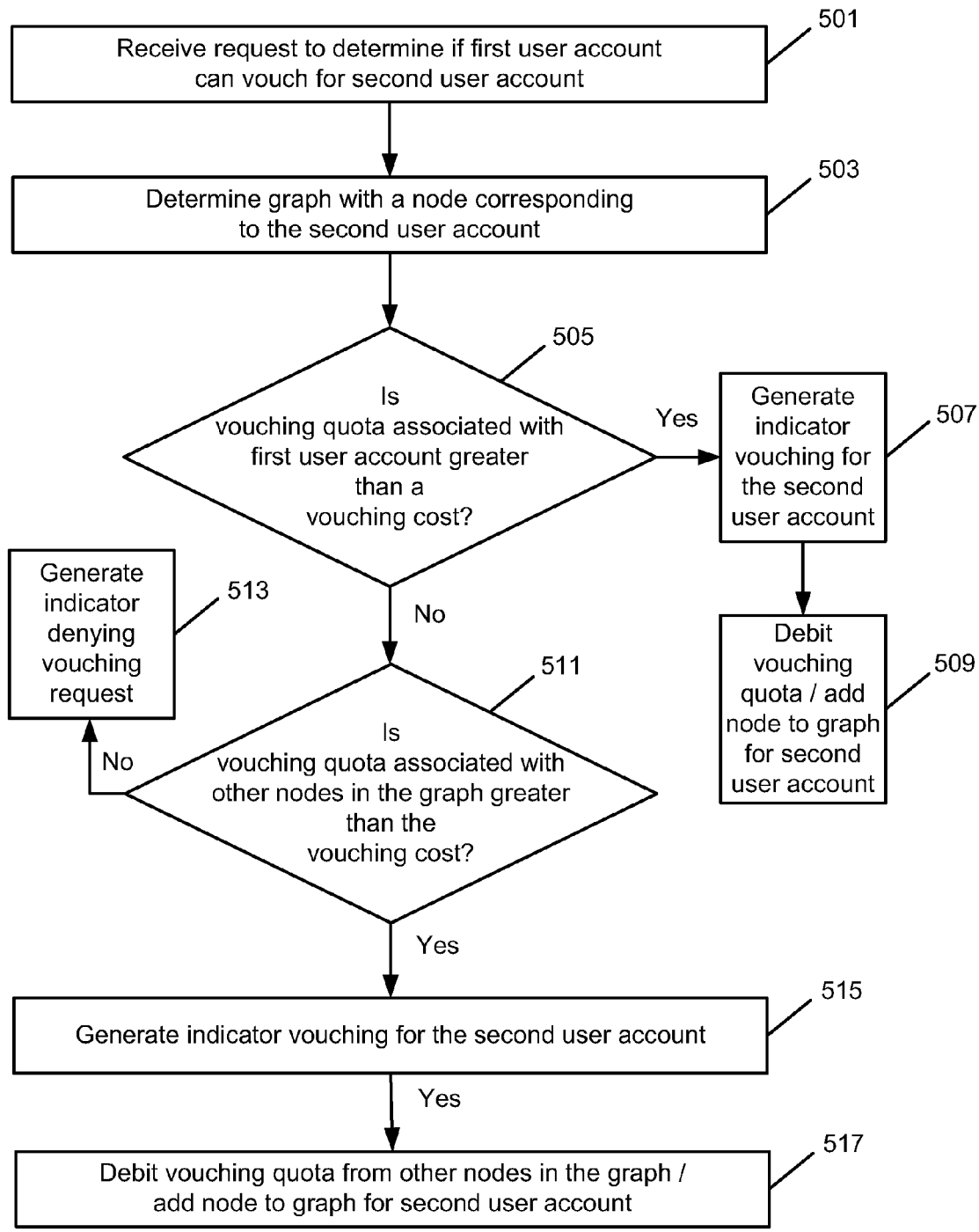
FIG. 5 illustrates another operational flow diagram of an exemplary method for vouching for user accounts.

FIG. 5 illustrates an operational flow diagram of an exemplary method 500 for vouching for user accounts. The method 500 may be implemented by the vouch engine 150.

A request to determine if a first user account can vouch for a second user account is received at 501. The request may be a vouch request 115 and may be received by the vouch engine 150 from the application provider 160. The first user account may be a trusted user account of the application provider 160, and the second user account may have a social networking relationship with the first user account, but otherwise may not be a trusted user account.

A graph with a node corresponding to the first user account is determined at 503. The graph may be determined by the vouch engine 150 from the graphs stored in the vouching data 157. In some implementations, the graph may be a tree, and may include a node corresponding to the first user account.

A determination is made as to whether vouching quota associated with the first user account is greater than a vouching cost at 505. Each user account may have an associated vouching quota that is associated with the node corresponding to the user account in the graph. If it is determined that the vouching quota associated with the first user account is greater than the vouching cost, then the method 500 may continue at 507. Otherwise, the method 500 may continue at 511.

An indication vouching for the second user account is generated at 507. The vouching quota associated with the first user account was greater than the vouching cost, and therefore the first user account may vouch for the second user account. The vouch engine 150 may generate an indication, such as a vouch message 155, that indicates that the first user account has vouched for the second user account, and may provide the indication to the application provider 160.

The vouching quota associated with the first user account is debited at 509. The vouching quota may be debited by the vouch engine 150. The vouching quota associated with the first user account may be debited by the vouching cost. In addition, a node may be added to the graph for the second user account. The second user account may be considered a trusted user account and may be added to the node graph that includes the node corresponding to the first account. The node may be added as a child node of the code corresponding to the first account.

A determination is made as to whether a total vouching quota associated with the other nodes in the graph is greater than the vouching cost at 511. The determination may be made by the vouch engine 150 and may comprise a determination as to whether the other nodes in the graph have vouching quota that can be borrowed by the first user account to vouch for the second user account. For example, the vouch engine 150 may determine if a sum of the vouching quota from each of the nodes in the graph is greater than the vouching cost. If it is determined that the vouching quota associated with the other nodes in the graph is greater than the vouching cost, then the method 500 may continue at 515. Otherwise, the method 500 may continue at 513.

In some implementations, where the graph is a tree, the vouch engine 150 may only consider nodes that are in a same sub-tree as the node corresponding to the first user account.

The sub-tree may be defined as the nodes in the graph that include any descendent nodes of the parent node of the node corresponding to the first user account.

An indication denying the vouching request is generated at 513. The indication may be a vouch message 155 and may be provided by the vouch engine 150 to the application provider 160. Because the vouching quota associated with the other nodes in the graph was less than the vouching amount, the vouch message 155 may indicate that the second user account cannot be vouched for by the first user account.

The vouching quotas associated with the user accounts in the graph are debited at 515. The vouching quota may be debited by the vouch engine 150. In some implementations, the vouching quota of each of the nodes in the graph may be debited by an equal fraction of the vouching amount. In addition, a node may be added to the graph for the second user account. The second user account may be considered a trusted user account and may be added to the node graph that includes the node corresponding to the first user account. The node may be added as a child node of the code corresponding to the first user account.

In some implementations, the vouch engine 150 may further determine if the graph that includes the node corresponding to the first trusted account and the node corresponding to the second user account has more than a threshold number of nodes. If the graph has more than a threshold number of nodes, then the graph may be divided into two graphs. In some implementations, where the graph is a tree, the sub-tree that includes the nodes corresponding to the first and second user accounts may be removed from the tree and used to create a new tree in the vouching data 157.

Figure 6:
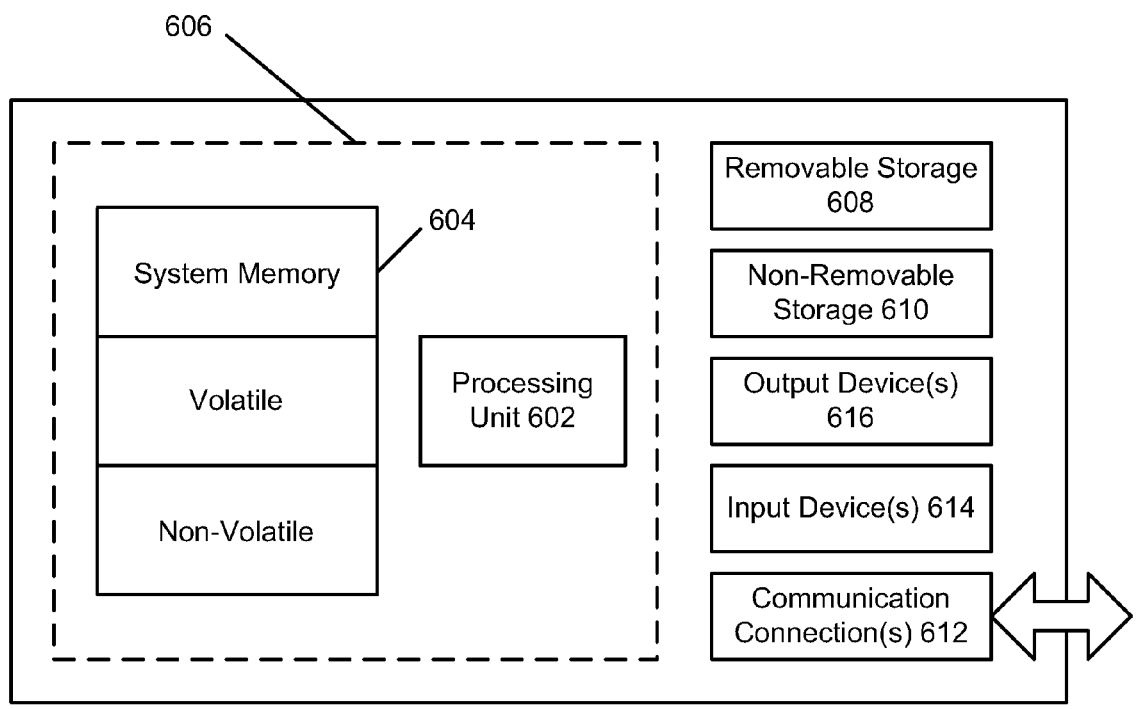
FIG. 6 shows an exemplary computing environment.

FIG. 6 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network personal computers, minicomputers, mainframe computers, embedded systems, distributed computing environments that include any of the above systems or devices, and the like.

With reference to FIG. 6, an exemplary system for implementing aspects described herein includes a computing device, such as computing device 600. In its most basic configuration, computing device 600 typically includes at least one processing unit 602 and memory 604. Depending on the exact configuration and type of computing device, memory 604 may be volatile (such as random access memory (RAM)), non-volatile (such as read-only memory (ROM), flash memory, etc.), or some combination of the two. This most basic configuration is illustrated in FIG. 6 by dashed line 606.

Computing device 600 may have additional features/functionality. For example, computing device 600 may include additional storage (removable and/or non-removable) including, but not limited to, magnetic or optical disks or tape. Such additional storage is illustrated in FIG. 6 by removable storage 608 and non-removable storage 610.

Computing device 600 typically includes a variety of computer readable media. Computer readable media can be any available media that can be accessed by device 600 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 604, removable storage 608, and non-removable storage 610 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of computing device 600.

Computing device 600 may contain communications connection(s) 612 that allow the device to communicate with other devices. Computing device 600 may also have input device(s) 614 such as a keyboard, mouse, pen, voice input device, touch input device, etc. Output device(s) 616 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   receiving a set of trusted user accounts at a computing device, wherein each trusted user account in the set of trusted user accounts is associated with its own vouching quota, and wherein the vouching quota associated with a trusted user account limits a number of untrusted user accounts that the trusted user account can vouch for;

determining, by the computing device, a trusted user account from the set of trusted user accounts that is associated with an untrusted user account;

determining whether the vouching quota associated with the determined trusted user account is greater than a vouching cost by the computing device; and when it is determined that the vouching quota is greater than the vouching cost, generating an indicator vouching for the untrusted user account by the computing device, wherein an amount of vouching quota associated with a trusted user account is based in part on a growth rate.

2. The method of claim 1, further comprising when it is not determined that the vouching quota is greater than the vouching cost, generating an indicator that the untrusted user account cannot be vouched for.

3. The method of claim 1, further comprising when it is determined that the vouching quota is greater than the vouching cost, adding the untrusted user account to the set of trusted user accounts.

4. The method of claim 1, further comprising when it is determined that the vouching quota is greater than the vouching cost, debiting the vouching cost from the vouching quota associated with the determined trusted user account.

5. The method of claim 1, wherein each of the trusted user accounts has an associated vouching quota, and when it is not determined that the vouching quota is greater than the vouching cost:

determining when a sum of the vouching quotas associated with one or more of the trusted user accounts is greater than the vouching cost; and when it is determined that the sum of the vouching quotas is greater than the vouching cost, generating an indicator vouching for the untrusted user account.

6. The method of claim 5, further comprising debiting the vouching quota of each of the one or more trusted user accounts by a portion of the vouching cost.

7. The method of claim 1, wherein the set of trusted user accounts comprises a graph with a node for each trusted user account.

8. The method of claim 1, wherein generating the indicator comprises generating a message.

9. A method comprising:

receiving a request to determine whether a first user account can vouch for a second user account at a computing device;

determining a graph with a node corresponding to the first user account from a plurality of graphs by the computing device, wherein each graph has a plurality of nodes, and each node has its own associated vouching quota, and wherein the vouching quota associated with the node corresponding to the first user account limits a number of user accounts that the first user account can vouch for;

determining whether the first user account can vouch for the second user account using the determined graph by the computing device, wherein the determining comprises determining whether the vouching quota associated with the node corresponding to the first user account is greater than a vouching cost; and when it is determined that the first user account can vouch for the second user account, generating an indicator that the first user account can vouch for the second user account by computing device, wherein an amount of vouching quota associated with a node is based in part on a growth rate.

10. The method of claim 9, further comprising debiting the vouching cost from the vouching quota associated with the node corresponding to the first user account.

11. The method of claim 9, further comprising adding a node corresponding to the second user account to the determined graph.

12. The method of claim 11, further comprising determining whether the determined graph has greater than a threshold number of nodes, and when it is determined that the determined graph has greater than the threshold number of nodes, splitting the determined graph into two graphs.

13. The method of claim 9, further comprising, when it is not determined that the vouching quota associated with the node corresponding to the first user account is greater than the vouching cost:

determining a sum of the vouching quota associated with each node in the determined graph;

determining whether the sum is greater than the vouching cost; and when it is determined that the sum is greater than the vouching cost, generating the indicator indicating that the first user account can vouch for the second user account.

14. The method of claim 13, further comprising debiting a portion of the vouching cost from the vouching quota associated with each node of the determined graph.

15. The method of claim 13, wherein some of the nodes in the determined graph are old nodes and wherein determining a sum of the vouching quota associated with each node in the determined graph further comprises discounting the sum based on a number of nodes in the determined graph that are old nodes.

16. The method of claim 9, further comprising denying any subsequent requests to determine whether the first user account can vouch for other user accounts for a predetermined amount of time.

17. A system comprising:

at least one computing device; and a vouch engine adapted to:

determine a set of trusted user accounts;

associate a vouching quota with each of the trusted user accounts, wherein each of the trusted user accounts is associated with its own vouching quota, wherein the vouching quota associated with a trusted user account limits a number of untrusted user accounts that the trusted user account can vouch for;

determine whether the vouching quota associated with a trusted user account is greater than a vouching cost, wherein the trusted user account is in the determined set of trusted user accounts; and when it is determined that the vouching quota is greater than the vouching cost, generating an indicator indicating that the trusted user account can vouch for an untrusted user account, wherein an amount of vouching quota associated with a trusted user account is based in part on a growth rate.

18. The system of claim 17, wherein the vouch engine is further adapted to add the untrusted user account to the set of trusted user accounts.

19. The system of claim 17, wherein the vouch engine is further adapted to debit the vouching quota associated with the trusted user account by the vouching cost.

20. The method of claim 1, wherein the growth rate comprises one or more of a determined growth rate, a historical growth rate, or a desired growth rate.

* * * * *